United States Patent Office
3,551,465
Patented Dec. 29, 1970

3,551,465
PREPARATION OF ORGANIC ESTERS FROM ALPHA-NITRO-KETONES
Alan F. Ellis, Murrysville, Pa., assignor to Gulf Research & Development Company, Pittsburgh, Pa., a corporation of Delaware
No Drawing. Filed Mar. 24, 1967, Ser. No. 625,608
Int. Cl. C07c 69/28, 69/76; C11c 3/00
U.S. Cl. 260—410.9
16 Claims

ABSTRACT OF THE DISCLOSURE

An organic ester is produced by a proces comprising: contacting in the liquid phase an alpha-nitro-ketone which contains at least three carbon atoms and which has at least one hydrogen atom attached to the same carbon atom which bears the nitro group; with an organic compound having from 1 to 10 carbon atoms and from 1 to 2 alcoholic hydroxyl groups attached to primary or secondary carbon atoms; in the presence of a basic catalyst under substantially anhydrous conditions; and wherein the stoichiometric ratio of said alcohol to said ketone is at least 0.8:1.

---

This invention relates to a process for the preparation of organic esters. In particular, this invention relates to a process for the preparation of organic esters from alpha-nitro-ketones.

In acordance with the invention, an organic ester is produced by a process which comprises:

contacting in the liquid phase an alpha-nitro-ketone which contains at least three carbon atoms and which has at least one hydrogen atom attached to the same carbon atom which bears the nitro group;
with an organic compound having from 1 to 10 carbon atoms and from 1 to 2 alcoholic hydroxyl groups attached to primary or secondary carbon atoms;
in the presence of a basic catalyst under substantially anhydrous conditions; and wherein the stoichiometric ratio of said alcohol to said ketone is at least 0.8:1.

The alpha-nitro-ketone charge stock which can be converted to the organic ester can be any nitro-ketone which contains at least three carbon atoms, a nitro group ($-NO_2$) on the carbon atom adjacent the keto group

and at least one hydrogen atom attached to the same carbon atom which bears the nitro group. The alpha-nitro-ketone suitably has between 3 and 25 carbon atoms, and preferably has between 4 and 16 carbon atoms.

The more preferred alpha-nitro-ketones have the formula:

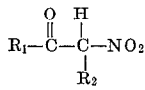

where $R_1$ is selected from the group consisting of an unsubstituted aliphatic radical having from 1 to 23 carbon atoms, a cycloaliphatic hydrocarbon radical having from 5 to 8 cyclic carbon atoms and from 5 to 23 total carbon atoms, and phenyl; and $R_2$ is selected from the group consisting of hydrogen and $R_1$ radicals as defined above; and wherein the sum of the carbon atoms in $R_1$ and $R_2$ is from 1 to 23, preferably from 2 to 14.

It is still more preferably that $R_2$ be hydrogen and $R_1$ be an unsubstituted aliphatic hydrocarbon radical having from 1 to 14 carbon atoms. When $R_2$ is hydrogen, the alpha-nitro-ketone is a 1-nitro,2-ketone, and conversion of this ketone always results in the production of nitromethane as the nitro-paraffin product. In addition, the acid portion of the ester resulting from conversion of the more preferred 1-nitro,2-ketones will always have one less carbon atom than the nitro-ketone charge stock.

Examples of suitable nitro-ketones include, but are not limited to: 1-nitro-propanone; 1-nitro-butanone-2; 2-nitro-butanone-3; 1-nitro-hexanone-2; 1-nitro-octanone-2; 1-nitrodecanone-2; 1-nitro-dodecanone-2; 1-nitro-tetradecanone - 2; 1 - nitro-hexadecanone-2; 1-nitro,4-ethyldodecanone-2; 1-nitro-eicosanone-2; 1-nitro-pentacosanone-2; 3-nitro-tetradecanone-4; 2-nitro,5,6-diethyloctanone-3;

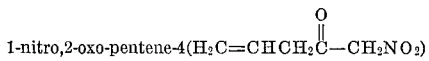

1-nitro,2-oxo-hexene-5; 1-nitro,2-oxo-decene-9; 2-nitro,3-oxo-decene-9; 2-nitro-cyclopentanone; 2-nitro-cyclohexanone; 2-nitro,4-hexylcyclohexanone; beta-nitro-acetophenone; beta-nitro-propiophenone; and 1,2-diphenyl,1-nitro-2-oxo-ethane.

The alcoholic reactant can be any organic compound having from 1 to 10 carbon atoms and from 1 to 2 alcoholic hydroxyl groups attached to primary or secondary carbon atoms. It is preferred that the alcoholic reactant be a monohydroxy aliphatic primary or secondary alcohol having from 1 to 4 carbon atoms. It has been found that a tertiary alcohol, i.e. where the hydroxyl group is attached to a tertiary carbon, is not reactive in the process of this inventioin. The dihydroxy alcohols are such that the hydroxyl groups are on different primary or secondary carbon atoms. By a primary carbon atom is meant a saturated carbon atom having one bond satisfied by carbon and two bonds satisfied by hydrogen. By a secondary carbon is meant a saturated carbon atom linked to two carbon atoms and a hydrogen atom.

Suitable monohydroxy alcohols can be represented by the formula:

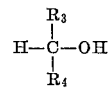

where $R_3$ and $R_4$ can be the same or different and are selected from the group consisting of hydrogen, an unsubstituted aliphatic radical having from 1 to 9 carbon atoms, cyclohexyl and phenyl; and wherein the sum of the carbon atoms in $R_3$ and $R_4$ is no more than 9.

Examples of suitable alcoholic reactants include, but are not limited to: methyl alcohol; ethyl alcohol; propyl alcohol; isopropyl alcohol; n-butyl alcohol; 2-methyl-1-propanol; secondary butyl alcohol; n-amyl alcohol; 3-methyl-1-butanol; n-hexyl alcohol; n-octyl alcohol; capryl alcohol (octanol-2); n-decyl alcohol; allyl alcohol; cyclohexanol; benzylalcohol; benzhydryl; ethylene glycol; propylene glycol; and hexamethylene glycol.

Mixtures of alcohols can also be employed, such as those obtained from the hydrogenation of hydroformylation reaction products.

The alcoholic reactant is contacted with the alpha-nitroketone reactant to form the desired organic ester in the presence of a basic catalyst. The reaction is believed to proceed according to the following equation using the preferred reactants:

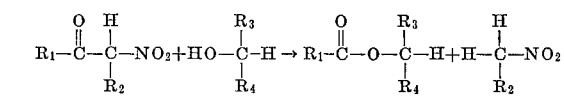

where $R_1$, $R_2$, $R_3$ and $R_4$ are as defined above.

It is necessary in the process of this invention to have the reactants in the liquid phase. Most of the alcoholic reactants and the lower carbon number nitroketones are in the liquid phase under the conditions of the reaction.

The alpha-nitro-ketones are generally soluble in the liquid alcoholic reactants, and it is preferred to employ a large excess of the alcohol to serve in effect as a solvent for the reaction. In those cases where the alcohol is used as a solvent, the stoichiometric ratio of the alcoholic reactant to the nitro-ketone reactant is usually at least 5:1 to 10:1 and can be 100:1 to 1000:1 or more. A stoichiometric ratio of 1:1 is, of course, necessary to obtain a theoretically complete reaction. Stoichiometric ratios of the alcohol to ketone reactant can suitably be as low as 0.8:1, but are preferably 1:1 or higher.

In those instances where both the nitro-ketone and alcohol reactants are solid under reaction conditions, a co-solvent is necessarily employed to dissolve both reactants to allow more intimate contacting of the reactants, that is, it is necessary to employ a co-solvent in order to have the reactants in the liquid phase. Since one of the reactants is not serving as a solvent, the preferred stoichiometric ratio of the alcohol reactant to the ketone reactant is less than 5:1 and is more preferably between 0.8:1 and 1.5:1. A co-solvent can, of course, be employed even though one or both reactants are in the liquid phase. The co-solvent must, of course, be liquid under reaction conditions, be inert towards the reactants and be a solvent for the reactants.

Suitable co-solvents include the liquid tertiary alcohols having between 4 and 8 carbon atoms, such as tertiary butanol; acetone and other lower unsubstituted ketones having between 3 and 8 carbon atoms; and liquid materials having relatively high dielectric strength, i.e. having a dielectric constant at 25° C. of at least 20, such as dimethylformamide, dimethylacetamide and dimethylsulfoxide.

The amount of co-solvent to employ is not critical but should, of course, be sufficient to dissolve the reactants.

If the ketone and alcoholic reactants are merely contacted with each other in the liquid phase by, for example, admixture of the liquid reactants, dissolving a solid ketone in a liquid alcohol, or employing a co-solvent, substantially no reaction will occur at room temperature and pressure. Increased temperatures and/or pressures promote the reaction but not to an extent sufficient for commercial interest. It is essential to the process of this invention that the alcoholic reactant be contacted with the ketone reactant in the liquid phase in the presence of a basic catalyst, at least a portion of which is soluble in the reaction medium.

Suitable basic catalysts are any organic bases which have a dissociation constant of greater than $10^{-10}$ at 25° C. and preferably greater than $10^{-5}$ at 25° C. Inorganic bases such as the alkali and alkaline earth metal oxides and hydroxides are also quite suitable and are generally preferred if they are sufficiently soluble in the reaction medium since they are generally stronger bases. It is thus seen that the most preferred basic catalysts are the strongest bases, i.e. those having the highest dissociation constants which are soluble in the reaction medium.

One preferred type of basic catalyst has the formula:

$$MeOX$$

where Me is any alkali or alkaline earth metal, O is oxygen and X is selected from the group consisting of hydrogen, $R_1$ as defined above, and

where $R_1$ is as defined above. The alkali and alkaline earth metals which are contemplated include lithium; sodium; potassium; rubidium; cesium; beryllium; magnesium; calcium; strontium; and barium. The most preferred alkali metals are sodium and potassium.

In some cases, the MeOX type bases may be undesirable due to solubility or otherwise, and in these cases or for any reason, it may be desirable to employ other types of basic catalysts, such as ammonia or the organic amines, such as those having between 2 and 10 carbon atoms per molecule. Diamines are also suitable.

Examples of suitable basic catalysts include, but are not limited to: sodium hydroxide; potassium hydroxide; lithium hydroxide; sodium acetate; sodium propionate; potassium heptanoate; sodium methoxide; potassium phenoxide; sodium hexadecanoate; lime; ammonia; triethylamine; trimethylamine; ethylene diamine; aniline; alpha-picoline; and pyridine.

It is obvious that the other alkali and alkaline earth metals could be substituted for the ones named in the examples above. It is also obvious other alkoxide groups could be attached to the metals or other alkyl groups could be attached to the amines. In short, any material well known in the art as a basic material can be used as a catalyst for the process of this invention which has a dissociation constant of at least $10^{-10}$ as defined above.

The amount of catalyst to employ is not critical and can vary from concentrations as low as 0.005 mole of catalyst per mole of the alpha-nitro-ketone to concentrations of 0.7 mole of catalyst per mole of ketone, or more. The preferred concentration of catalyst is between 0.01 and 0.1 mole of catalyst per mole of alpha-nitro-ketone. The weaker bases are used in the higher concentration range to achieve more reasonable rates of reaction. The minimum amount of catalyst should be employed to achieve the desired rate of reaction.

As the carbon number of the alcohol reactant and/or the carbon number of the nitro-ketone reactant increases, the polarity of the reaction system decreases and the solubility of the inorganic MeOX type catalysts mentioned above tends to decrease. Since the organic amine type catalysts are generally more soluble in organic materials they would be the preferred catalyst for use with the higher carbon number alcohol and ketone charge stocks, i.e. alcohols having more than four carbon atoms and ketones having more than eight carbon atoms.

The reaction temperature is not critical and can vary within wide limits. Suitable reaction temperatures are between 20° and 150° C. with preferred temperatures between 40° and 100° C. Temperatures below 20° C. are not suitable, since the rate of reaction becomes undesirably slow even at high catalyst concentrations. Temperatures above 150° C. are undesirable since they promote unwanted side reactions, such as decomposition of the nitro-ketone and the by-product nitro-paraffin. The reaction pressure is likewise not critical and can be between 0.5 atmosphere and 100 atmospheres, or more. Pressure should be sufficient to keep the reactants in the liquid phase. Atmospheric pressure is preferred. The reaction time will depend somewhat on temperature and can be between 0.5 and 20 hours. The usual reaction times are between 2 and 5 hours.

The esterification reaction should be run under substantially anhydrous reaction conditions. By substantially anhydrous is meant wherein the reaction medium contains a stoichiometric ratio of water to ketone of less than 0.2:1 and preferably less than 0.02:1. If water is present in the reaction mixture, it will tend to hydrolyze the ester product to alcohol and organic acid which is undesirable.

The reaction product is usually a one-phase mixture of unreacted charge materials, the desired ester, the basic catalyst and a nitro-paraffin which is acidic in nature. The components of the reaction mixture can be separated by any suitable procedure, such as by distillation. It is preferred, however, to remove the basic catalyst before it is concentrated in the presence of the acidic nitro-paraffin, for a concentrated mixture of a basic catalyst and a nitro-paraffin—especially nitro methane—tends to be explosive in nature. One suitable procedure to remove the basic catalyst is to pass the total reaction product through a column filled with an acidic ion exchange resin. The basic catalyst tends to associate with the resin. The ion exchange resin must, of course, be a stronger acid than the nitro-paraffin. The resin column can be treated later to remove the basic catalyst.

The invention will be further described with reference to the following experimental work.

EXAMPLE 1

2.57 grams of 1-nitro-tetradecanone-2 and 0.023 gram (1 mm.) of sodium metal and 30 ml. of absolute methanol were admixed, stirred, and heated at reflux (65° C.) for two hours. The resulting solution was analyzed by gas liquid chromatography which indicated the presence of methyl tridecanoate and nitro methane. 2.2 grams of the ester were recovered, indicating a yield of 90 percent of theoretical.

EXAMPLE 2

Ten grams of 1-nitro-tetradecanone-2 were dissolved with heating in 300 ml. of absolute methanol. The resulting solution was saturated with anhydrous ammonia by bubbling the ammonia through the solution. The resulting clear solution was evaporated in a steam bath at atmospheric pressure and 100° C. Eight grams of a clear yellow oil were recovered and gas liquid chromatography confirmed that the oil was methyl tridecanoate.

EXAMPLE 3

Example 1 was repeated except n-propanol was employed as the alcoholic reactant and the reflux temperature was 97° C. Analysis showed that n-propyl tridecanoate was formed as the major product.

A comparison of Examples 1 and 2 shows that various basic materials including sodium metal and ammonia can be used to catalyze the subject reaction. The sodium metal reacts with the methanol in Example 1 to form sodium methoxide which is probably the active catalyst. Comparison of Examples 1 and 3 shows that various carbon number alcohols can be used in the subject reaction.

EXAMPLE 4

In the run for this example, a solution of 1.17 grams (10 mm.) of 1-nitro-butanone-2 in 15 ml. of absolute alcohol containing 1.0 mm. of sodium ethoxide was heated at 60° C. for four hours. Gas chromatographic analysis of the resulting solution indicated that ethyl propionate and nitro methane were formed from the nitro-butanone charge.

EXAMPLE 5

In the run for this example a solution of 1.17 grams (10 mm.) of 1-nitro-butanone-2 in 15 ml. of isopropanol containing 1.0 mm. of sodium isopropoxide was heated at 60° C. for 16 hours. Gas chromatographic analysis for the resulting solution indicated that isopropyl propionate and nitro methane were formed.

EXAMPLE 6

In the run for this example a solution of 1.17 grams (10 mm.) of 1-nitro-butanone-2 in 15 ml. of tertiary butyl alcohol containing 1.0 mm. of potassium, tertiary butoxide was heated at 60° C. for 16 hours. Gas chromatographic analysis of the resulting solution indicated no tertiary butyl propionate had formed.

A comparison of Examples 4, 5 and 6 shows that primary (Example 4) and secondary (Example 5) alcohols can successfully be employed in the process of this invention, but that tertiary alcohols (Example 6) are unreactive in the process of this invention.

EXAMPLE 7

A series of runs were made to determine the relative rates of reaction using various basic catalysts. In each of the runs, 1.17 grams (10 millimoles) of 1-nitro-butanone-2 in 25 ml. of absolute ethanol containing 1.0 millimoles of a chosen base was heated to 78° C. for five hours. The chosen bases were triethylamine, alphapicoline and aniline.

Samples were taken after one hour and after five hours of reaction and analyzed by gas liquid chromatography to determine the amount of disappearance of the alpha-nitro-ketone. From these analyses it was determined that the relative rates of reaction for the three bases was 60, 2 and 1 respectively.

The data are given in Table I below.

TABLE I.—ETHANOLYSIS OF 1-NITRO-BUTANONE-2 AT 78° C.

| Base | Dissociation constant at 25° C. | Mole percent of the nitro-ketone reacted after— | | Relative rate |
|---|---|---|---|---|
| | | 1 hr. | 5 hrs. | |
| Aniline | $3.82 \times 10^{-10}$ | 2 | 14 | 1 |
| Alpha-picoline | $3 \times 10^{-8}$ | 5 | 26 | 2 |
| Triethylamine | $5.65 \times 10^{-4}$ | 60 | 0 | 60 |

The runs in Example 7 show that materials with the higher dissociation constants result as expected in much faster rates of reaction.

EXAMPLE 8

In the run for this example, 1.17 grams of 1-nitro-butanone-2 was admixed with 0.1 gram (1 millimole) of triethylamine and 15 milliliters of ethylene glycol. The mixture was heated to 150° C. for five hours.

Gas liquid chromatographic analysis indicated the presence of an ester product and nitro methane.

EXAMPLE 9

Example 8 was repeated except decanol-1 was used in place of ethylene glycol.

Gas liquid chromatographic analysis again indicated the presence of an ester and nitro methane.

EXAMPLE 10

Example 8 was repeated except benzyl alcohol was used in place of the ethylene glycol.

Gas liquid chromatographic analysis again indicated the presence of an ester and nitro methane.

Examples 8 through 10 show that other alcoholic hydroxyl containing reactants are suitable for use in the subject reaction.

Resort may be had to such variations and modifications as fall within the spirit of the invention and the scope of the appended claims.

I claim:
1. A process for the preparation of an organic ester which comprises:
    contacting in the liquid phase an alpha-nitro-ketone which contains at least three carbon atoms and which has at least one hydrogen atom attached to the same carbon atom which bears the nitro group;
    with an organic compound having from 1 to 10 carbon atoms and from 1 to 2 hydroxyl groups attached to primary or secondary carbon atoms;
    in the presence of a basic catalyst under substantially anhydrous conditions, and wherein the stoichiometric ratio of said alcohol to said ketone is at least 0.8:1.
2. A process according to claim 1 wherein the alpha-nitro-ketone has the formula:

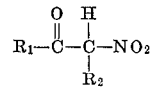

where $R_1$ is selected from the group consisting of an unsubstituted aliphatic hydrocarbon radical having from 1 to 23 carbon atoms, a cycloaliphatic hydrocarbon radical having from 5 to 8 cyclic carbon atoms and from 5 to 23 total carbon atoms, and phenyl; and $R_2$ is selected from the group consisting of hydrogen and $R_1$ radicals as defined above; and wherein the sum of the carbon atoms in $R_1$ and $R_2$ is from 1 to 23.

3. A process according to claim 1 wherein the organic compound has the formula:

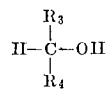

where $R_3$ and $R_4$ can be the same or different and are selected from the group consisting of hydrogen, an unsubstituted aliphatic hydrocarbon radical having from 1 to 9 carbon atoms, cyclohexyl and phenyl; and wherein the sum of the carbon atoms in $R_3$ and $R_4$ is no more than 9.

4. A process according to claim 1 wherein the basic catalyst is selected from the group consisting of ammonia, an organic amine having a dissociation constant of greater than $10^{-10}$ at 25° C. and a compound having the formula:

MeOX where Me is any alkali or alkaline earth metal; O is oxygen; and X is selected from the group consisting of: hydrogen; $R_1$, where $R_1$ is an unsubstituted aliphatic hydrocarbon radical having from 1 to 23 carbon atoms; a cycloaliphatic hydrocarbon radical having from 5 to 8 cyclic carbon atoms and from 5 to 23 total carbon atoms; or phenyl; and

where $R_1$ is as defined.

5. A process according to claim 2 wherein $R_2$ is hydrogen and $R_1$ is an unsubstituted aliphatic hydrocarbon radical having from 1 to 14 carbon atoms.

6. A process according to claim 5 wherein the organic compound has the formula:

where $R_3$ and $R_4$ can be the same or different and are selected from the group consisting of hydrogen, an unsubstituted aliphatic hydrocarbon radical having from 1 to 9 carbon atoms, cyclohexyl and phenyl; and wherein the sum of the carbon atoms in $R_3$ and $R_4$ is no more than 9.

7. A process according to claim 5 wherein the basic catalyst is selected from the group consisting of ammonia, an organic amine having a dissociation constant of greater than $10^{-10}$ at 25° C. and a compound having the formula:

MeOX where Me is any alkali or alkaline earth metal; O is oxygen; and X is selected from the group consisting of: hydrogen; $R_1$, where $R_1$ is an unsubstituted aliphatic hydrocarbon radical having from 1 to 23 carbon atoms; a cycloaliphatic hydrocarbon radical having from 5 to 8 cyclic carbon atoms and from 5 to 23 total carbon atoms; or phenyl; and

where $R_1$ is as defined.

8. A process according to claim 6 wherein the organic compound has the formula:

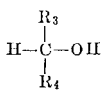

where $R_3$ and $R_4$ can be the same or different and are selected from the group consisting of hydrogen, an unsubstituted aliphatic hydrocarbon radical having from 1 to 9 carbon atoms, cyclohexyl and phenyl; and wherein the sum of the carbon atoms in $R_3$ and $R_4$ is no more than 9.

9. A process according to claim 1 wherein said contacting occurs at a temperature between 20° and 150° C.

10. A process according to claim 5 wherein the nitroketone is 1-nitro-tetradecanone-2.

11. A process according to claim 3 wherein the organic compound is methanol.

12. A process according to claim 3 wherein the organic compound is propanol.

13. A process according to claim 5 wherein the nitroketone is 1-nitro-butanone-2.

14. A process according to claim 1 wherein the organic compound is ethylene glycol.

15. A process according to claim 5 wherein the basic catalyst is triethylamine.

16. A process according to claim 5 wherein the organic compound is methanol.

References Cited

Wagner et al., "Synthetic Organic Chemistry," 1953, p. 488.

Gould, "Mechanism and Structure in Organic Chemistry," 1959, pp. 365–371.

LORRAINE A. WEINBERGER, Primary Examiner

R. S. WEISSBERG, Assistant Examiner

U.S. Cl. X.R.

260—410, 410.5, 410.6, 468, 476, 486, 488